United States Patent
Shrestha et al.

(10) Patent No.: US 12,200,688 B2
(45) Date of Patent: Jan. 14, 2025

(54) TRANSMISSION, RETRANSMISSION, AND HARQ PROCESS FOR PRECONFIGURED UPLINK RESOURCE IN IDLE MODE

(71) Applicant: Apple Inc., Cupertino, CA (US)

(72) Inventors: Bharat Shrestha, Hillsboro, OR (US); Seau Sian Lim, Swindon (GB); Marta Martinez Tarradell, Hillsboro, OR (US)

(73) Assignee: APPLE INC., Cupertino, CA (US)

( * ) Notice: Subject to any disclaimer, the term of this patent is extended or adjusted under 35 U.S.C. 154(b) by 434 days.

(21) Appl. No.: 17/288,817

(22) PCT Filed: Oct. 24, 2019

(86) PCT No.: PCT/US2019/057885
§ 371 (c)(1),
(2) Date: Apr. 26, 2021

(87) PCT Pub. No.: WO2020/092126
PCT Pub. Date: May 7, 2020

(65) Prior Publication Data
US 2021/0410166 A1  Dec. 30, 2021

Related U.S. Application Data

(60) Provisional application No. 62/754,479, filed on Nov. 1, 2018.

(51) Int. Cl.
*H04W 72/1268* (2023.01)
*H04L 1/1607* (2023.01)
(Continued)

(52) U.S. Cl.
CPC ....... *H04W 72/1268* (2013.01); *H04L 1/1678* (2013.01); *H04L 5/0055* (2013.01); *H04W 72/23* (2023.01)

(58) Field of Classification Search
CPC ............. H04W 72/1268; H04W 72/23; H04W 40/005; H04W 74/0833; H04L 1/1678;
(Continued)

(56) References Cited

U.S. PATENT DOCUMENTS

2009/0196261 A1*  8/2009  Sambhwani ........ H04W 74/002
370/335
2010/0142494 A1*  6/2010  Hsu .......................... H04L 1/189
370/336
(Continued)

FOREIGN PATENT DOCUMENTS

CN           103299703 A      9/2013
EP           2360979 A1 *     8/2011  ........... H04L 1/0026
(Continued)

OTHER PUBLICATIONS

PCT/US2019/057885, International Search Report and Written Opinion, Feb. 14, 2020, 12 pages.
(Continued)

*Primary Examiner* — Khaled M Kassim
*Assistant Examiner* — Oladiran Gideon Olaleye
(74) *Attorney, Agent, or Firm* — Dorsey & Whitney LLP

(57) ABSTRACT

A user equipment (UE) in idle mode may use a preconfigured uplink resource for transmission, retransmission, and/or hybrid automatic repeat request (HARQ). For example, the UE may store configuration data for a preconfigured uplink resource and a radio network temporary identifier (RNTI) for idle mode communication. In idle mode, the UE generates an uplink transmission using the preconfigured uplink resource. After the uplink transmission, the UE starts a retransmission timer, and monitors physical downlink control channel (PDCCH) with the RNTI provided in the configuration data for HARQ acknowledgement/negative acknowledgement (ACK/NACK).

13 Claims, 9 Drawing Sheets

(51) Int. Cl.
*H04L 5/00* (2006.01)
*H04W 72/23* (2023.01)

(58) Field of Classification Search
CPC ... H04L 5/0055; H04L 1/1822; H04L 1/1893; H04L 1/188; H04L 1/189; H04L 1/1812
USPC ......................................................... 370/336
See application file for complete search history.

(56) References Cited

U.S. PATENT DOCUMENTS

| | | | |
|---|---|---|---|
| 2012/0113904 A1 | 5/2012 | Anderson et al. | |
| 2012/0127934 A1* | 5/2012 | Anderson | H04W 72/20 370/329 |
| 2012/0300715 A1* | 11/2012 | Pelletier | H04W 56/0005 370/329 |
| 2014/0029459 A1* | 1/2014 | Kwon | H04W 76/28 370/252 |
| 2018/0124798 A1* | 5/2018 | Ramamurthi | H04L 1/1893 |
| 2018/0199359 A1 | 7/2018 | Yu et al. | |

FOREIGN PATENT DOCUMENTS

| | | | | |
|---|---|---|---|---|
| KR | 1020140014544 | | 2/2014 | |
| WO | WO-2011098236 A1 | * | 8/2011 | ........... H04L 1/0026 |
| WO | 2012062668 A1 | | 5/2012 | |
| WO | WO-2017148403 A1 | * | 9/2017 | ........ H04W 52/0235 |

OTHER PUBLICATIONS

Nokia, Nokia Shanghai Bell, "Signaling Aspects for transmission in preconfigured resources", R2-1814413, 3GPP TSG RAN WG2 Meeting #103bis, Chengdu, China, Agenda Item 12.2.4, Oct. 8-12, 2018, 2 pages.

Qualcomm Incorporated, "Email discussion report: [99#45][NB-IOT/MTC] Early data transmission", R2-1710888, 3GPP TSG-RAN WG2 Meeting #99bis, Prague, Czechia, Agenda Item 9.14.2, Oct. 9-13, 2017, 42 pages.

Ericsson, "Transmission in preconfigured uplink resources", R2-1814342, 3GPP TSG-RAN WG2 #103bis, Chengdu, P.R. China, Agenda Item 12.2.4, Oct. 8-12, 2018, 8 pages.

* cited by examiner

TRANSMISSION, RETRANSMISSION, AND HARQ PROCESS FOR PRECONFIGURED UPLINK RESOURCE IN IDLE MODE

CROSS-REFERENCE TO RELATED APPLICATION(S)

This application is a national stage filing under 35 U.S.C. § 371 of International Patent Application No. PCT/US2019/057885, filed Oct. 24, 2019 which claims the benefit of U.S. Provisional Application No. 62/754,479, filed Nov. 1, 2018, each of which is hereby incorporated herein by reference in its entirety.

TECHNICAL FIELD

This application relates generally to wireless communication systems, and more specifically to using preconfigured uplink resources in idle mode.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, and the E-UTRAN implements LTE RAT.

A core network can be connected to the UE through the RAN Node. The core network can include a serving gateway (SGW), a packet data network (PDN) gateway (PGW), an access network detection and selection function (ANDSF) server, an enhanced packet data gateway (ePDG) and/or a mobility management entity (MME).

DETAILED DESCRIPTION

Figure 1:
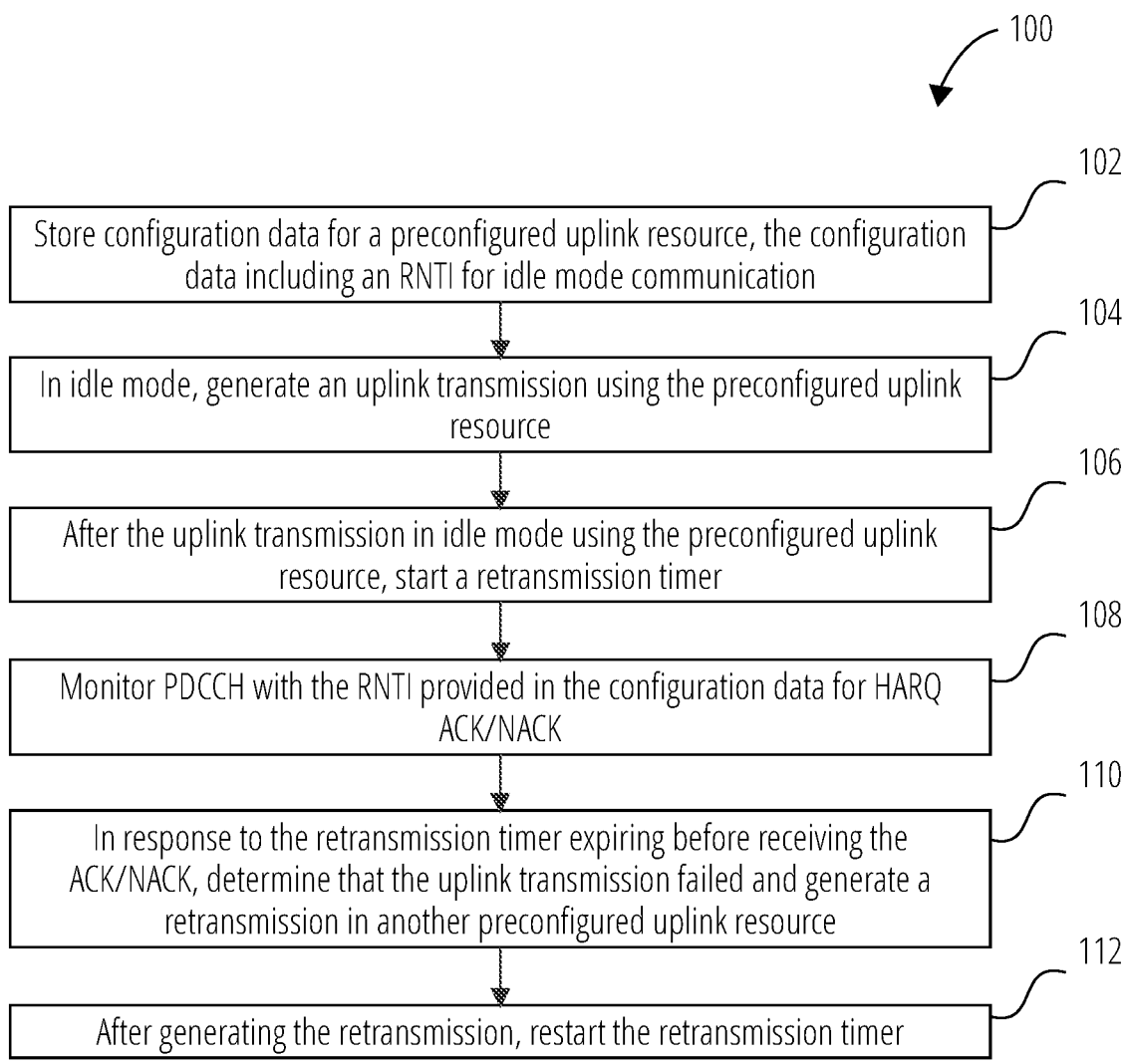
FIG. 1 is a flowchart illustrating a method for a UE in a wireless network in accordance with one embodiment.

A cell provides a communication link between a in a wireless network and a UE. The UE in the cell usually has two working states: a connected state and an idle state. The cell configures, for the UE in the connected state, a cell radio network temporary identity (C-RNTI) that can uniquely identify the UE in the cell, and the UE can perform data communication in the cell based on the C-RNTI using a dedicated uplink/downlink resource. When the UE has no service or a service of the UE is not being used, the wireless network may instruct the UE to enter the idle state. When the UE in the idle state needs to send uplink data or receive downlink data, the UE initiates random access (RA) and a radio resource control (RRC) connection setup process so that the UE can re-obtain the C-RNTI and enter the connected state. The UE can then use dedicated uplink/downlink resources again to perform data communication.

Certain embodiments herein provide transmission in dedicated preconfigured uplink resources in the idle state (also referred to herein as idle mode) for UEs with a valid timing advance (TA). While initial focus may be on dedicated preconfigured uplink resources in idle mode, shared resources may also be considered.

In idle mode, hybrid automatic repeat request (HARQ) may be supported for transmission in dedicated preconfigured uplink resources. For example, a single HARQ process may be supported. In other embodiments, more than one HARQ process may be supported. Certain embodiments may include a redesign of the corresponding machine-type communications (MTC) physical downlink control channel (MPDCCH) search space.

In idle mode, according to certain embodiments, dedicated preconfigured uplink resource (PUR) is supported, and may include at least one of contention-free shared PUR and cell broadcast service (CBS) PUR.

For uplink (UL) transmission in preconfigured resource, according to certain embodiments, a fallback mechanism to random access channel (RACH) and/or early data transmission (EDT) procedures is supported.

For transmission in preconfigured UL resources, according to certain embodiments, an RRC idle UE may use the latest TA that passed the validation criteria.

In certain embodiments, preconfigured UL resources for transmission of data are indicated by RRC signaling. At least UE-specific RRC signaling may be supported.

Previously, a UE had no HARQ configuration to use in idle mode. In certain embodiments herein, the preconfigured uplink resource (PUR) can be configured for the UE, when in connected mode, to be used in idle mode. When a HARQ process is supported for transmission in PUR in idle mode, the HARQ process may be similar to or the same as a HARQ process in random access or normal HARQ procedure in connected mode. Embodiments disclosed herein may apply a HARQ process and handle retransmissions for transmission in PUR.

When PUR is configured by dedicated RRC signaling or broadcast, parameters such as transport block size (TBS), periodicity and allowed coverage enhancement (CE) level, number of HARQ process, etc. may be configured for the PUR in idle mode.

If the UE has UL data larger than the size indicated in the TBS parameter, the UE may use PUR to send an RRC connection request message plus a buffer status report (BSR) plus a segment of the UL data.

For a control plane (CP) solution, according to certain embodiments, the UE may send an RRC connection request with a non-access stratum (NAS) protocol data unit (PDU) (i.e., RRCEarlyDataRequest) with or without a BSR. If the CP data in the NAS PDU does not fit in the TBS for the PUR, the UE may send an RRC connection request message with only a NAS service request with or without the BSR.

Interaction between NAS and access stratum (AS) may be used to decide whether to transmit the CP data plus NAS signaling or only NAS signaling or only a NAS service request over the PUR based on the TBS size limit of the PUR. In certain embodiments, interaction between NAS and AS may be left to UE implementation.

For a user plane (UP) solution, according to certain embodiments, the UE may activate the AS security if it has received a next-hop chaining counter (NCC) in the previous connection before transmitting an RRC connection resume request message with or without multiplexed user plane data and/or BSR. A new message class for the RRC connection resume request message may be used to indicate to the base station (e.g., eNB or gNB) that security has been activated. If the user data is larger than the TBS for the PUR, segmentation may be performed, and the segment data may be multiplexed with the RRC resume request message.

In another embodiment, the UE may activate AS security only when the UE can send the multiplexed user UL data in the PUR, otherwise the UE sends the legacy RRCConnectionResume message with or without a BSR in the PUR.

HARQ Process

Certain embodiments apply a same or similar HARQ process as that used in random access procedures.

Other embodiments modify the HARQ process used in random access procedures. For example, if multiple HARQ processes are supported, a separate random access procedure may be initiated for each HARQ process. HARQ feedback (e.g., acknowledgment (ACK) or negative acknowledgement (NACK) information) and/or a new grant for transmission or retransmission in response to transmission in the PUR may indicate the HARQ process identifier (ID).

In certain embodiments, after an UL transmission in the PUR, the UE starts a new retransmission timer. The UE monitors a physical downlink control channel (PDCCH) in a common search space (CSS) provided in the common configuration with a new RNTI provided in a PUR configuration. If the retransmission timer expires and nothing is received (e.g., an ACK/NACK or other message is not received from the eNB), the UE determines that the transmission in the PUR was a failure and generates a retransmission in another PUR. After each retransmission, according to certain embodiments, the PUR retransmission timer is restarted. In addition, or in another embodiment, if the retransmission timer expires and nothing is received by the UE, the UE may autonomously fallback to initiate a legacy/EDT random access. In yet another embodiment, if the retransmission timer expires and nothing is received by the UE, the UE may assume that the transmission in the PUR was successful.

While the retransmission timer is running, according to certain embodiments, the base station (e.g., eNB or gNB) may take certain actions. For example, the base station may provide a retransmission grant addressed to the new RNTI. In certain embodiments, the base station may provide a NACK indicating to the UE to fallback to initiate legacy/EDT random access. The base station may also provide the successful ID or an indication that may be similar to or the same as a contention resolution MAC CE, so the UE can go to sleep immediately. In certain embodiments, the base station can schedule an RRC message that instructs the UE to stay in idle mode (e.g., similar to EarlyDataComplete or RRCConnectionRelease message in EDT) or move to connected mode (e.g., RRCConnectionSetup or RRCConnectionResume message). As indicated above, after each retransmission, the PUR retransmission timer may be restarted.

In certain embodiments, the HARQ process in idle mode may follow UL HARQ. For example, after UL transmission, the UE may start a HARQ RTT timer and then start a discontinuous reception mode (DRX) retransmission timer, wherein: if the timer expires and nothing is received by the UE, the UE determines a failure of the transmission and generates a retransmission in another PUR; if the timer expires and nothing received by the UE, the UE may fallback to legacy/EDT random access; or if the timer expires and nothing is received by the UE, the UE may assume that the transmission was successful.

In certain embodiments, the HARQ process in idle mode may be similar to or the same as UL HARQ wherein the HARQ process corresponds to the transmission time interval (TTI). After the last repetition of a physical uplink shared channel (PUSCH), the UE monitors the PDCCH for ACK/NACK in the predefined search space, for example same search space as the CSS used for a random access response. The monitoring of the PDCCH may start in the xth TTI (for example fourth TTI) after the last repetition of the PUSCH. If nothing is received by the UE, the UE may consider the transmission a failure and retransmits in the next PUR or initiates a new legacy RACH/EDT. If NACK is received, the UE retransmits using the same resource configuration in the TTI that corresponds to the same HARQ process of the initial transmission. If ACK is received, the UE considers the transmission to be successful.

PUR Transmission Successful

In certain embodiments, if the UE receives an RRC message (indicating to the UE to stay in IDLE or move to RRC_CONNECTED) in response to a transmission in the PUR, the RRC message may include a new TA command and/or NCC, and may restart TA validity timer. Based on a BSR, the base station (e.g., eNB or gNB) may provide a further UL grant for the UE to transmit the remaining UL data indicating a new HARQ process.

In another embodiment, if the UE does not receive anything or an ACK in response to transmission in the PUR and transmission is considered successful, the UE can go back to idle mode.

In certain embodiments, if the UE is using UP cellular internet of things (C-IoT) optimization and has already activated security for transmission in the PUR, the UE may use the same existing keys in the next PUR while a current TA is still valid, if the UE still has additional data to transmit. To use EDT in the PUR, a condition to initiate EDT may be added that even if there are multiple packets to transmit, EDT can be used for the PUR.

In certain embodiments, for a single HARQ process, HARQ process ID=0 can be used.

In certain embodiments, for multiple HARQ processes, the HARQ process ID may be determined as follows: HARQ Process ID=[floor(CURRENT_TTI/PURinterval)] modulo numberOfHARQ-Processes, where CURRENT_TTI=[(SFN*10)+subframe number], where SFN is the system frame number, and CURRENT_TTI refers to the subframe where the first transmission of a bundle takes place.

For synchronous HARQ, according to certain embodiments, HARQ process ID=CURRENT_TTI modulo numberOfHARQ-Processes.

Certain embodiments provide for the release of the PUR in idle mode. For example, in one embodiment, if the UE determines to release the PUR and the TA validity timer is still running, the UE may send a new RRC message, a media access control (MAC) control element (CE), or layer 1 (L1) signaling in the PUR to indicate to the base station (e.g., eNB or gNB) of release of the PUR. In another embodiment, if the UE initiates a legacy RRC connection/resume establishment procedure using legacy physical RACH (PRACH) resource or initiates EDT using an EDT PRACH resource, the PUR may be released.

Example Methods

FIG. 1 is a flowchart illustrating a method 100 for a UE in a wireless network according to one embodiment. In block 102, the UE stores configuration data for a preconfigured uplink resource. The configuration data includes a radio network temporary identifier (RNTI) for idle mode communication. In block 104, in an idle mode, the UE generates an uplink transmission using the preconfigured uplink resource. In block 106, after the uplink transmission in idle mode using the preconfigured uplink resource, the UE starts a retransmission timer. In block 108, the UE monitors a physical downlink control channel (PDCCH) in a common search space (CSS) with the RNTI provided in the configuration data for a hybrid automatic repeat request (HARQ) acknowledgment (ACK) or negative acknowledgment (NACK). In block 110, in response to the retransmission timer expiring before receiving the ACK or the NACK, the UE determines that the uplink transmission failed and generates a retransmission in another preconfigured uplink resource. In block 112, after generating the retransmission, the UE restarts the retransmission timer.

Figure 2:
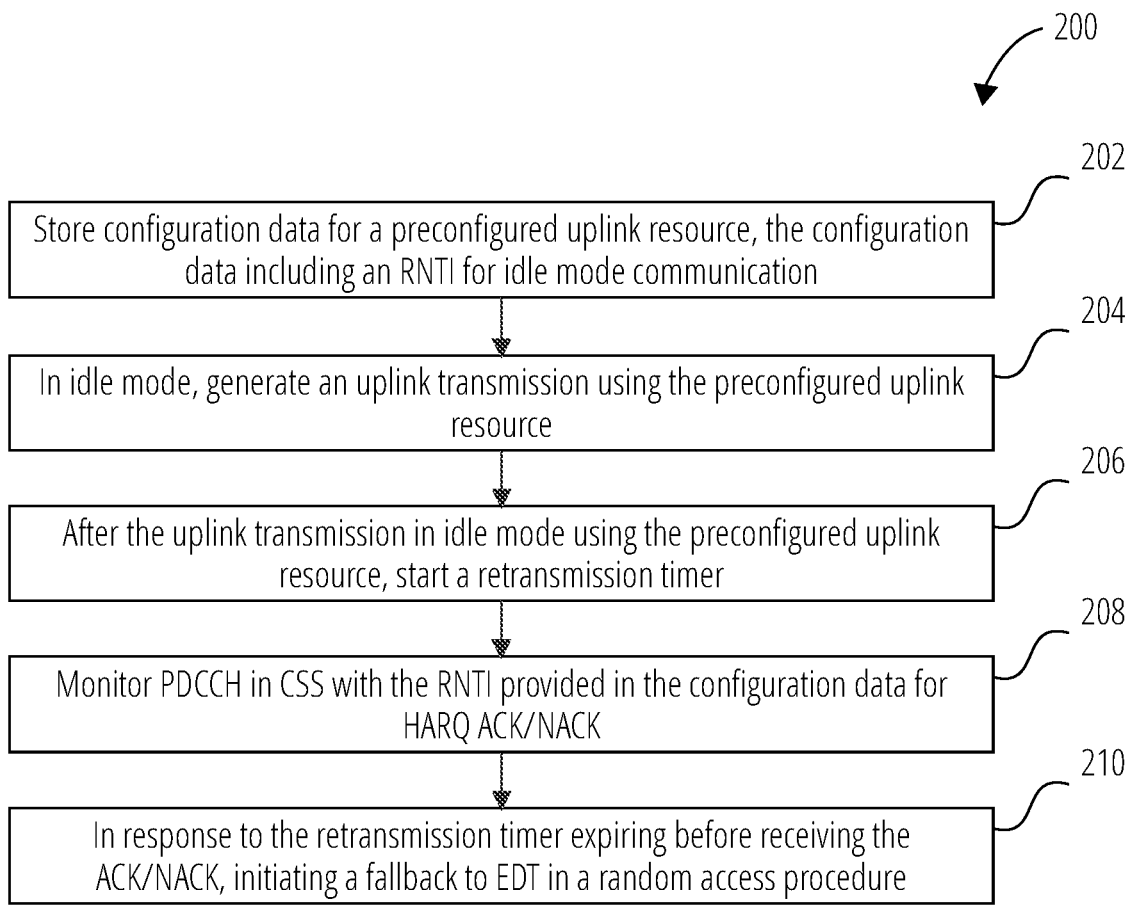
FIG. 2 is a flowchart illustrating a method for a UE in a wireless network in accordance with another embodiment.

FIG. 2 is a flowchart illustrating a method 200 for a UE in a wireless network according to another embodiment. In block 202, the UE stores configuration data for a preconfigured uplink resource. The configuration data includes a radio network temporary identifier (RNTI) for idle mode communication. In block 204, in an idle mode, the UE generates an uplink transmission using the preconfigured uplink resource. In block 206, after the uplink transmission in idle mode using the preconfigured uplink resource, the UE starts a retransmission timer. In block 208, the UE monitors a physical downlink control channel (PDCCH) in a common search space (CSS) with the RNTI provided in the configuration data for a hybrid automatic repeat request (HARQ) acknowledgment (ACK) or negative acknowledgment (NACK). In block 210, in response to the retransmission timer expiring before receiving the ACK or the NACK, the UE initiates a fallback to early data transmission (EDT) or a random access procedure.

Figure 3:
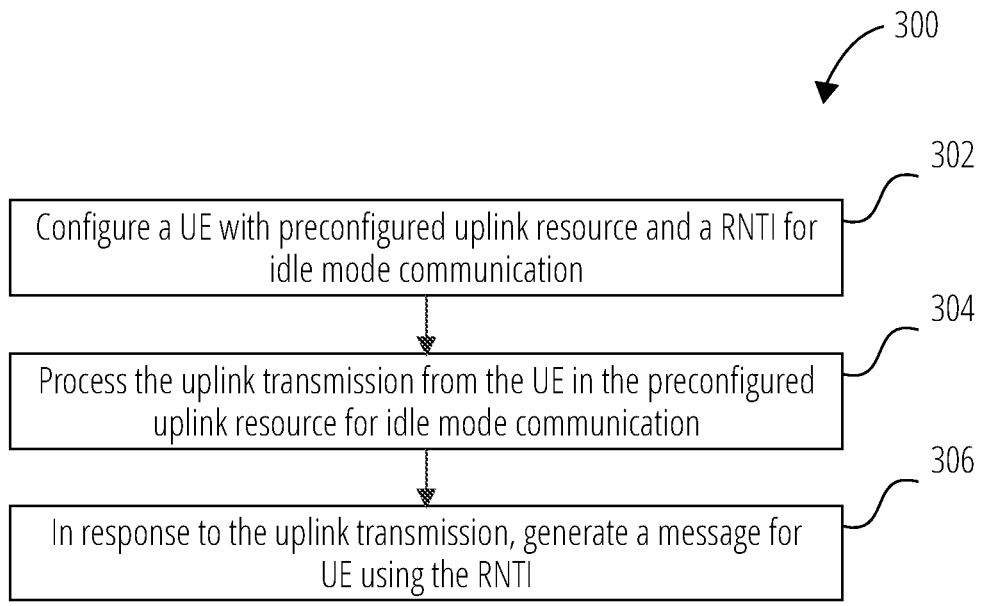
FIG. 3 is a flowchart illustrating a method for a base station (e.g., eNB or gNB) in a wireless network in accordance with one embodiment.

FIG. 3 is a flowchart illustrating a method 300 for a for a base station (e.g., eNB or gNB) in a wireless network according to one embodiment. In block 302, the method 300 configures a UE with a preconfigured uplink resource and a radio network temporary identifier (RNTI) for idle mode communication. In block 304, the method 300 processes an uplink transmission from the UE in the radio network temporary identifier (RNTI) for idle mode communication. In block 306, in response to the uplink transmission, the method 300 generates a message for the UE using the RNTI.

Example Systems and Apparatuses

Figure 4:
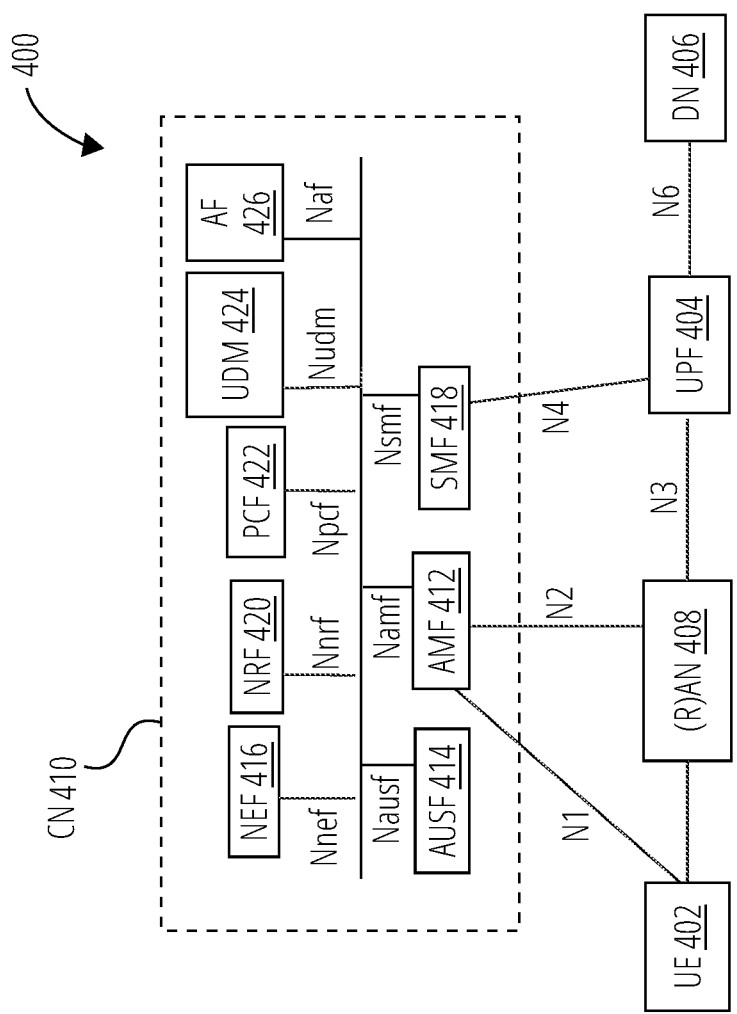
FIG. 4 illustrates a system in accordance with one embodiment.

FIG. 4 illustrates an architecture of a system 400 of a network in accordance with some embodiments. The system 400 is shown to include a UE 402; a 5G access node or RAN node (shown as (R)AN node 408); a User Plane Function (shown as UPF 404); a Data Network (DN 406), which may be, for example, operator services, Internet access or 3rd party services; and a 5G Core Network (5GC) (shown as CN 410).

The CN 410 may include an Authentication Server Function (AUSF 414); a Core Access and Mobility Management Function (AMF 412); a Session Management Function (SMF 418); a Network Exposure Function (NEF 416); a Policy Control Function (PCF 422); a Network Function (NF) Repository Function (NRF 420); a Unified Data Management (UDM 424); and an Application Function (AF 426). The CN 410 may also include other elements that are not shown, such as a Structured Data Storage network function (SDSF), an Unstructured Data Storage network function (UDSF), and the like.

The UPF 404 may act as an anchor point for intra-RAT and inter-RAT mobility, an external PDU session point of interconnect to DN 406, and a branching point to support multi-homed PDU session. The UPF 404 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 404 may include an uplink classifier to support routing traffic flows to a data network. The DN 406 may represent various network operator services, Internet access, or third party services.

The AUSF 414 may store data for authentication of UE 402 and handle authentication related functionality. The AUSF 414 may facilitate a common authentication framework for various access types.

The AMF 412 may be responsible for registration management (e.g., for registering UE 402, etc.), connection management, reachability management, mobility management, and lawful interception of AMF-related events, and access authentication and authorization. AMF 412 may provide transport for SM messages for the SMF 418, and act as a transparent proxy for routing SM messages. AMF 412 may also provide transport for short message service (SMS) messages between UE 402 and an SMS function (SMSF) (not shown by FIG. 4). AMF 412 may act as Security Anchor Function (SEA), which may include interaction with the AUSF 414 and the UE 402, receipt of an intermediate key that was established as a result of the UE 402 authentication process. Where USIM based authentication is used, the AMF 412 may retrieve the security material from the AUSF 414. AMF 412 may also include a Security Context Management (SCM) function, which receives a key from the SEA that it uses to derive access-network specific keys. Furthermore, AMF 412 may be a termination point of RAN CP interface (N2 reference point), a termination point of NAS (NI) signaling, and perform NAS ciphering and integrity protection.

AMF 412 may also support NAS signaling with a UE 402 over an N3 interworking-function (IWF) interface. The N3IWF may be used to provide access to untrusted entities. N3IWF may be a termination point for the N2 and N3 interfaces for control plane and user plane, respectively, and as such, may handle N2 signaling from SMF and AMF for PDU sessions and QoS, encapsulate/de-encapsulate packets for IPSec and N3 tunneling, mark N3 user-plane packets in the uplink, and enforce QoS corresponding to N3 packet marking taking into account QoS requirements associated to such marking received over N2. N3IWF may also relay uplink and downlink control-plane NAS (NI) signaling between the UE 402 and AMF 412, and relay uplink and downlink user-plane packets between the UE 402 and UPF 404. The N3IWF also provides mechanisms for IPsec tunnel establishment with the UE 402.

The SMF 418 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF 418 may include the following roaming functionality: handle local enforcement to apply QoS SLAB (VPLMN); charging data collection and charging interface (VPLMN); lawful intercept (in VPLMN for SM events and interface to LI System); support for interaction with external DN for transport of signaling for PDU session authorization/authentication by external DN.

The NEF 416 may provide means for securely exposing the services and capabilities provided by 3GPP network functions for third party, internal exposure/re-exposure, Application Functions (e.g., AF 426), edge computing or fog computing systems, etc. In such embodiments, the NEF 416 may authenticate, authorize, and/or throttle the AFs. NEF 416 may also translate information exchanged with the AF 426 and information exchanged with internal network functions. For example, the NEF 416 may translate between an AF-Service-Identifier and an internal 5GC information. NEF 416 may also receive information from other network functions (NFs) based on exposed capabilities of other network functions. This information may be stored at the NEF 416 as structured data, or at a data storage NF using a standardized interfaces. The stored information can then be re-exposed by the NEF 416 to other NFs and AFs, and/or used for other purposes such as analytics.

The NRF 420 may support service discovery functions, receive NF Discovery Requests from NF instances, and provide the information of the discovered NF instances to the NF instances. NRF 420 also maintains information of available NF instances and their supported services.

The PCF 422 may provide policy rules to control plane function(s) to enforce them, and may also support unified policy framework to govern network behavior. The PCF 422 may also implement a front end (FE) to access subscription information relevant for policy decisions in a UDR of UDM 424.

The UDM 424 may handle subscription-related information to support the network entities' handling of communication sessions, and may store subscription data of UE 402. The UDM 424 may include two parts, an application FE and a User Data Repository (UDR). The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with PCF 422. UDM 424 may also support SMS management, wherein an SMS-FE implements the similar application logic as discussed previously.

The AF 426 may provide application influence on traffic routing, access to the Network Capability Exposure (NCE), and interact with the policy framework for policy control. The NCE may be a mechanism that allows the 5GC and AF 426 to provide information to each other via NEF 416, which may be used for edge computing implementations. In such implementations, the network operator and third party services may be hosted close to the UE 402 access point of attachment to achieve an efficient service delivery through the reduced end-to-end latency and load on the transport network. For edge computing implementations, the 5GC may select a UPF 404 close to the UE 402 and execute traffic steering from the UPF 404 to DN 406 via the N6 interface. This may be based on the UE subscription data, UE location, and information provided by the AF 426. In this way, the AF 426 may influence UPF (re)selection and traffic routing. Based on operator deployment, when AF 426 is considered to be a trusted entity, the network operator may permit AF 426 to interact directly with relevant NFs.

As discussed previously, the CN 410 may include an SMSF, which may be responsible for SMS subscription checking and verification, and relaying SM messages to/from the UE 402 to/from other entities, such as an SMS-GMSC/IWMSC/SMS-router. The SMS may also interact with AMF 412 and UDM 424 for notification procedure that the UE 402 is available for SMS transfer (e.g., set a UE not reachable flag, and notifying UDM 424 when UE 402 is available for SMS).

The system 400 may include the following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

The system 400 may include the following reference points: N1: Reference point between the UE and the AMF; N2: Reference point between the (R)AN and the AMF; N3: Reference point between the (R)AN and the UPF; N4: Reference point between the SMF and the UPF; and N6: Reference point between the UPF and a Data Network.

There may be many more reference points and/or service-based interfaces between the NF services in the NFs, however, these interfaces and reference points have been omitted for clarity. For example, an NS reference point may be between the PCF and the AF; an N7 reference point may be between the PCF and the SMF; an N11 reference point between the AMF and SMF; etc. In some embodiments, the CN 410 may include an Nx interface, which is an inter-CN interface between the MME (e.g., MME(s) 714) and the AMF 412 in order to enable interworking between CN 410 and CN 706.

Although not shown by FIG. 4, the system 400 may include multiple RAN nodes (such as (R)AN node 408) wherein an Xn interface is defined between two or more (R)AN node 408 (e.g., gNBs and the like) that connecting to 5GC 410, between a (R)AN node 408 (e.g., gNB) connecting to CN 410 and an eNB, and/or between two eNBs connecting to CN 410.

In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 402 in a connected mode (e.g., CM-CONNECTED) including functionality to manage the UE mobility for connected mode between one or more (R)AN node 408. The mobility support may include context transfer from an old (source) serving (R)AN node 408 to new (target) serving (R)AN node 408; and control of user plane tunnels between old (source) serving (R)AN node 408 to new (target) serving (R)AN node 408.

A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

Figure 5:
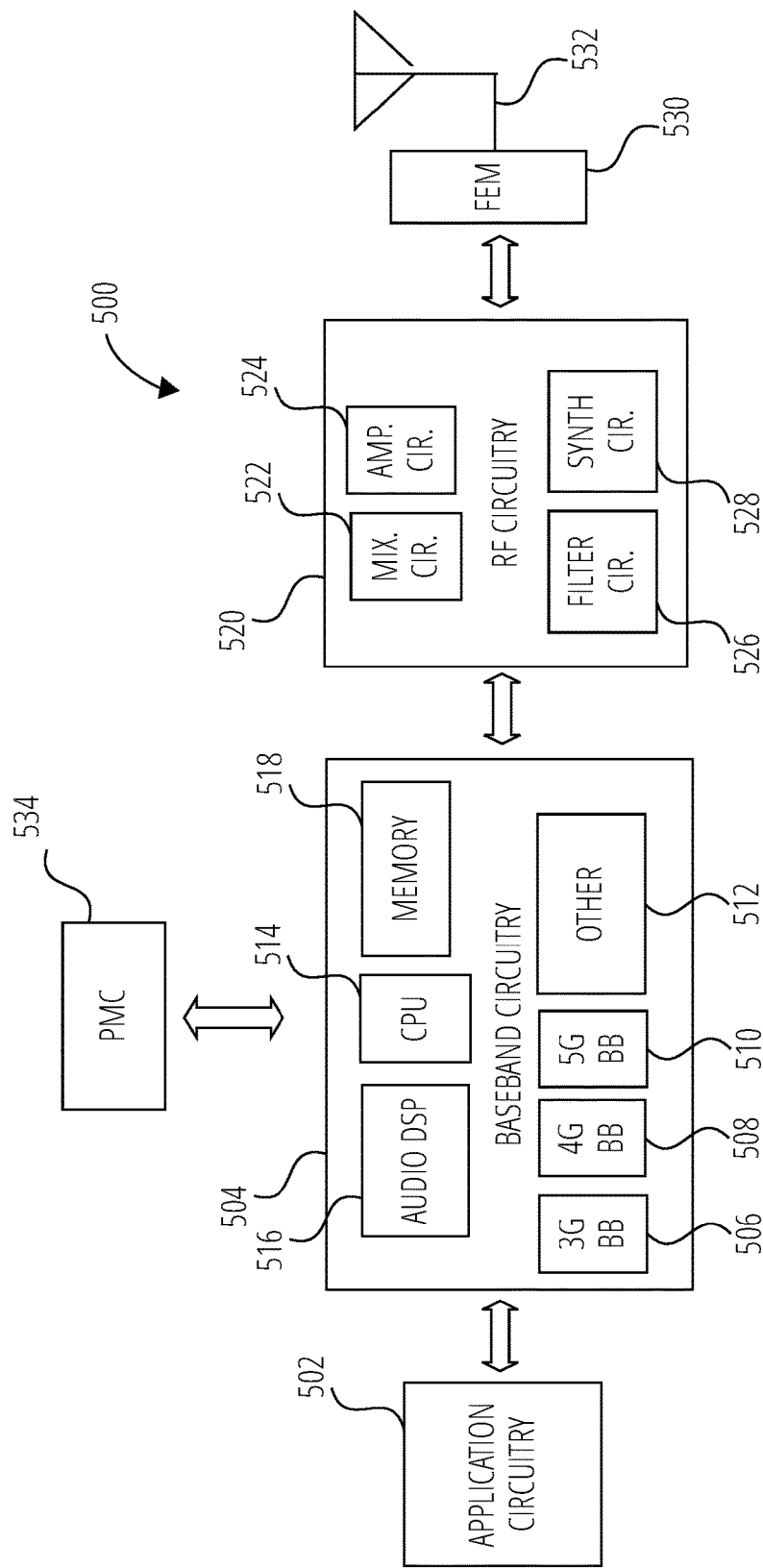
FIG. 5 illustrates a device in accordance with one embodiment.

FIG. 5 illustrates example components of a device 500 in accordance with some embodiments. In some embodiments, the device 500 may include application circuitry 502, baseband circuitry 504, Radio Frequency (RF) circuitry (shown as RF circuitry 520), front-end module (FEM) circuitry (shown as FEM circuitry 530), one or more antennas 532, and power management circuitry (PMC) (shown as PMC 534) coupled together at least as shown. The components of the illustrated device 500 may be included in a UE or a RAN node. In some embodiments, the device 500 may include fewer elements (e.g., a RAN node may not utilize application circuitry 502, and instead include a processor/controller to process IP data received from an EPC). In some embodiments, the device 500 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 502 may include one or more application processors. For example, the application circuitry 502 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 500. In some embodiments, processors of application circuitry 502 may process IP data packets received from an EPC.

The baseband circuitry 504 may include circuitry such as, but not limited to, one or more single-core or multi-core processors. The baseband circuitry 504 may include one or more baseband processors or control logic to process baseband signals received from a receive signal path of the RF circuitry 520 and to generate baseband signals for a transmit signal path of the RF circuitry 520. The baseband circuitry 504 may interface with the application circuitry 502 for generation and processing of the baseband signals and for controlling operations of the RF circuitry 520. For example, in some embodiments, the baseband circuitry 504 may include a third generation (3G) baseband processor (3G baseband processor 506), a fourth generation (4G) baseband processor (4G baseband processor 508), a fifth generation (5G) baseband processor (5G baseband processor 510), or other baseband processor(s) 512 for other existing generations, generations in development or to be developed in the future (e.g., second generation (2G), sixth generation (6G), etc.). The baseband circuitry 504 (e.g., one or more of baseband processors) may handle various radio control functions that enable communication with one or more radio networks via the RF circuitry 520. In other embodiments, some or all of the functionality of the illustrated baseband processors may be included in modules stored in the memory 518 and executed via a Central Processing Unit (CPU 514). The radio control functions may include, but are not limited to, signal modulation/demodulation, encoding/decoding, radio frequency shifting, etc. In some embodiments, modulation/demodulation circuitry of the baseband circuitry 504 may include Fast-Fourier Transform (FFT), precoding, or constellation mapping/demapping functionality. In some embodiments, encoding/decoding circuitry of the baseband circuitry 504 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 504 may include a digital signal processor (DSP), such as one or more audio DSP(s) 516. The one or more audio DSP(s) 516 may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 504 and the application circuitry 502 may be implemented together such as, for example, on a system on a chip (SOC).

In some embodiments, the baseband circuitry 504 may provide for communication compatible with one or more radio technologies. For example, in some embodiments, the baseband circuitry 504 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 504 is configured to support radio communications of more than one wireless protocol may be referred to as multi-mode baseband circuitry.

The RF circuitry 520 may enable communication with wireless networks using modulated electromagnetic radiation through a non-solid medium. In various embodiments, the RF circuitry 520 may include switches, filters, amplifiers, etc. to facilitate the communication with the wireless network. The RF circuitry 520 may include a receive signal path which may include circuitry to down-convert RF signals received from the FEM circuitry 530 and provide baseband signals to the baseband circuitry 504. The RF circuitry 520 may also include a transmit signal path which may include circuitry to up-convert baseband signals provided by the baseband circuitry 504 and provide RF output signals to the FEM circuitry 530 for transmission.

In some embodiments, the receive signal path of the RF circuitry 520 may include mixer circuitry 522, amplifier circuitry 524 and filter circuitry 526. In some embodiments, the transmit signal path of the RF circuitry 520 may include filter circuitry 526 and mixer circuitry 522. The RF circuitry 520 may also include synthesizer circuitry 528 for synthesizing a frequency for use by the mixer circuitry 522 of the receive signal path and the transmit signal path. In some embodiments, the mixer circuitry 522 of the receive signal path may be configured to down-convert RF signals received from the FEM circuitry 530 based on the synthesized frequency provided by synthesizer circuitry 528. The amplifier circuitry 524 may be configured to amplify the down-converted signals and the filter circuitry 526 may be a low-pass filter (LPF) or band-pass filter (BPF) configured to remove unwanted signals from the down-converted signals to generate output baseband signals. Output baseband signals may be provided to the baseband circuitry 504 for further processing. In some embodiments, the output baseband signals may be zero-frequency baseband signals, although this is not a requirement. In some embodiments, the mixer circuitry 522 of the receive signal path may comprise passive mixers, although the scope of the embodiments is not limited in this respect.

In some embodiments, the mixer circuitry 522 of the transmit signal path may be configured to up-convert input baseband signals based on the synthesized frequency provided by the synthesizer circuitry 528 to generate RF output signals for the FEM circuitry 530. The baseband signals may be provided by the baseband circuitry 504 and may be filtered by the filter circuitry 526.

In some embodiments, the mixer circuitry 522 of the receive signal path and the mixer circuitry 522 of the transmit signal path may include two or more mixers and may be arranged for quadrature downconversion and upconversion, respectively. In some embodiments, the mixer circuitry 522 of the receive signal path and the mixer circuitry 522 of the transmit signal path may include two or more mixers and may be arranged for image rejection (e.g., Hartley image rejection). In some embodiments, the mixer circuitry 522 of the receive signal path and the mixer circuitry 522 may be arranged for direct downconversion and direct upconversion, respectively. In some embodiments, the mixer circuitry 522 of the receive signal path and the mixer circuitry 522 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 520 may include analog-to-digital converter (ADC) and digital-to-analog converter (DAC) circuitry and the baseband circuitry 504 may include a digital baseband interface to communicate with the RF circuitry 520.

In some dual-mode embodiments, a separate radio IC circuitry may be provided for processing signals for each spectrum, although the scope of the embodiments is not limited in this respect.

In some embodiments, the synthesizer circuitry 528 may be a fractional-N synthesizer or a fractional N/N+1 synthesizer, although the scope of the embodiments is not limited in this respect as other types of frequency synthesizers may be suitable. For example, synthesizer circuitry 528 may be a delta-sigma synthesizer, a frequency multiplier, or a synthesizer comprising a phase-locked loop with a frequency divider.

The synthesizer circuitry 528 may be configured to synthesize an output frequency for use by the mixer circuitry 522 of the RF circuitry 520 based on a frequency input and a divider control input. In some embodiments, the synthesizer circuitry 528 may be a fractional N/N+1 synthesizer.

In some embodiments, frequency input may be provided by a voltage controlled oscillator (VCO), although that is not a requirement. Divider control input may be provided by either the baseband circuitry 504 or the application circuitry 502 (such as an applications processor) depending on the desired output frequency. In some embodiments, a divider control input (e.g., N) may be determined from a look-up table based on a channel indicated by the application circuitry 502.

Synthesizer circuitry 528 of the RF circuitry 520 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 528 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 520 may include an IQ/polar converter.

The FEM circuitry 530 may include a receive signal path which may include circuitry configured to operate on RF signals received from one or more antennas 532, amplify the received signals and provide the amplified versions of the received signals to the RF circuitry 520 for further processing. The FEM circuitry 530 may also include a transmit signal path which may include circuitry configured to amplify signals for transmission provided by the RF circuitry 520 for transmission by one or more of the one or more antennas 532. In various embodiments, the amplification through the transmit or receive signal paths may be done solely in the RF circuitry 520, solely in the FEM circuitry 530, or in both the RF circuitry 520 and the FEM circuitry 530.

In some embodiments, the FEM circuitry 530 may include a TX/RX switch to switch between transmit mode and receive mode operation. The FEM circuitry 530 may include a receive signal path and a transmit signal path. The receive signal path of the FEM circuitry 530 may include an LNA to amplify received RF signals and provide the amplified received RF signals as an output (e.g., to the RF circuitry 520). The transmit signal path of the FEM circuitry 530 may include a power amplifier (PA) to amplify input RF signals (e.g., provided by the RF circuitry 520), and one or more filters to generate RF signals for subsequent transmission (e.g., by one or more of the one or more antennas 532).

In some embodiments, the PMC 534 may manage power provided to the baseband circuitry 504. In particular, the PMC 534 may control power-source selection, voltage scaling, battery charging, or DC-to-DC conversion. The PMC 534 may often be included when the device 500 is capable of being powered by a battery, for example, when the device 500 is included in a UE. The PMC 534 may increase the power conversion efficiency while providing desirable implementation size and heat dissipation characteristics.

FIG. 5 shows the PMC 534 coupled only with the baseband circuitry 504. However, in other embodiments, the PMC 534 may be additionally or alternatively coupled with, and perform similar power management operations for, other components such as, but not limited to, the application circuitry 502, the RF circuitry 520, or the FEM circuitry 530.

In some embodiments, the PMC 534 may control, or otherwise be part of, various power saving mechanisms of the device 500. For example, if the device 500 is in an RRC_Connected state, where it is still connected to the RAN node as it expects to receive traffic shortly, then it may enter a state known as Discontinuous Reception Mode (DRX) after a period of inactivity. During this state, the device 500 may power down for brief intervals of time and thus save power.

If there is no data traffic activity for an extended period of time, then the device 500 may transition off to an RRC_Idle state, where it disconnects from the network and does not perform operations such as channel quality feedback, handover, etc. The device 500 goes into a very low power state and it performs paging where again it periodically wakes up to listen to the network and then powers down again. The device 500 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 502 and processors of the baseband circuitry 504 may be used to execute elements of one or more instances of a protocol stack. For example, processors of the baseband circuitry 504, alone or in combination, may be used to execute Layer 3, Layer 2, or Layer 1 functionality, while processors of the application circuitry 502 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 6:
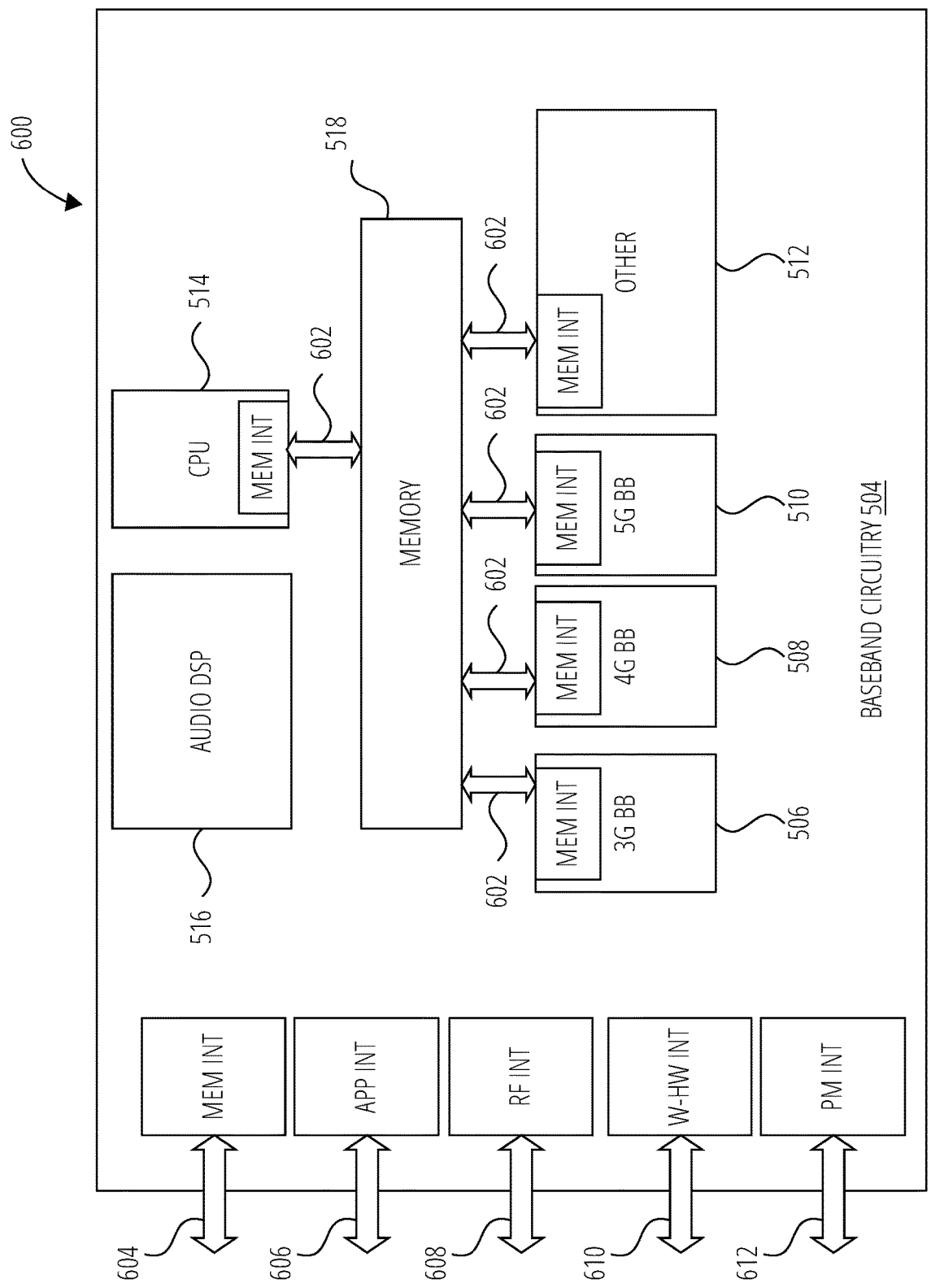
FIG. 6 illustrates example interfaces in accordance with one embodiment.

FIG. 6 illustrates example interfaces 600 of baseband circuitry in accordance with some embodiments. As discussed above, the baseband circuitry 504 of FIG. 5 may comprise 3G baseband processor 506, 4G baseband processor 508, 5G baseband processor 510, other baseband processor(s) 512, CPU 514, and a memory 518 utilized by said processors. As illustrated, each of the processors may include a respective memory interface 602 to send/receive data to/from the memory 518.

The baseband circuitry 504 may further include one or more interfaces to communicatively couple to other circuitries/devices, such as a memory interface 604 (e.g., an interface to send/receive data to/from memory external to the baseband circuitry 504), an application circuitry interface 606 (e.g., an interface to send/receive data to/from the application circuitry 502 of FIG. 5), an RF circuitry interface 608 (e.g., an interface to send/receive data to/from RF circuitry 520 of FIG. 5), a wireless hardware connectivity interface 610 (e.g., an interface to send/receive data to/from Near Field Communication (NFC) components, Bluetooth® components (e.g., Bluetooth® Low Energy), Wi-Fi® components, and other communication components), and a power management interface 612 (e.g., an interface to send/receive power or control signals to/from the PMC 534.

Figure 7:
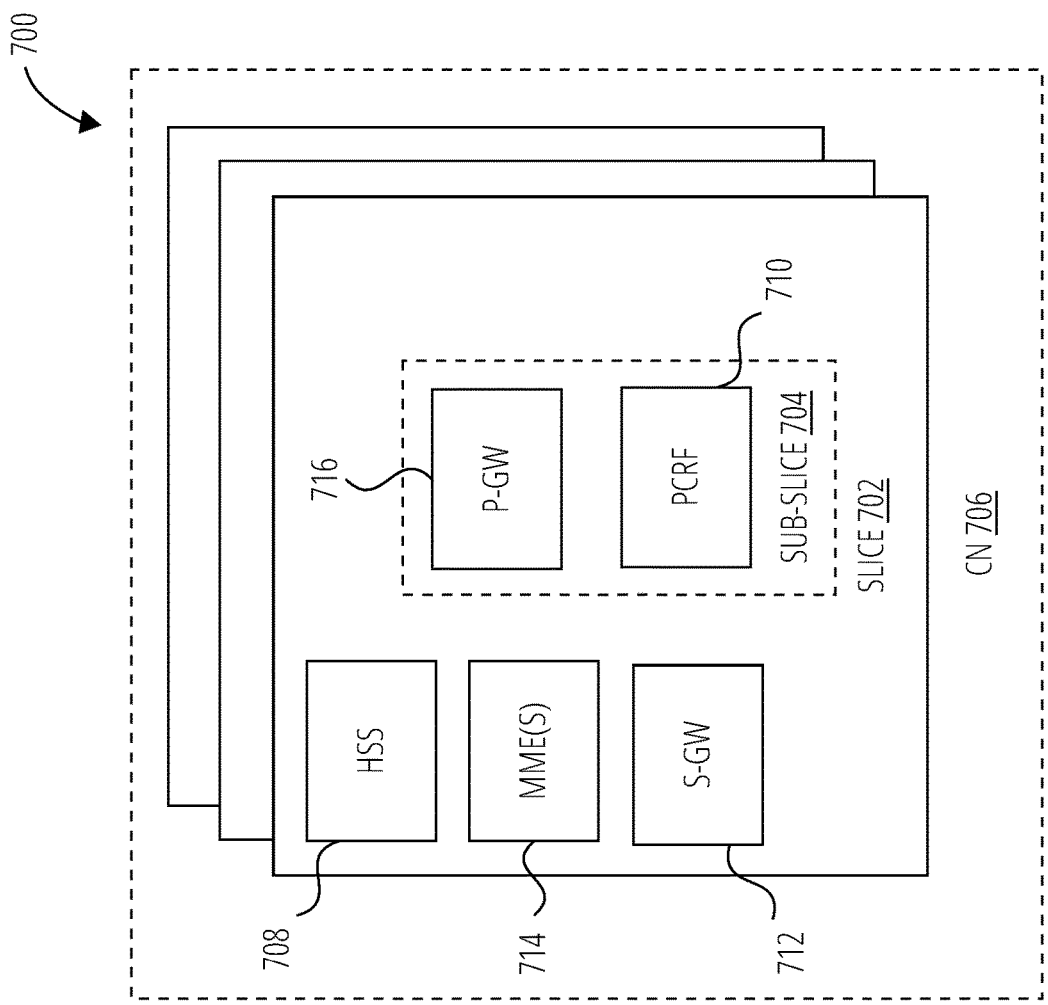
FIG. 7 illustrates components in accordance with one embodiment.

FIG. 7 illustrates components 700 of a core network in accordance with some embodiments. The components of the CN 706 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the CN 706 may be referred to as a network slice 702 (e.g., the network slice 702 is shown to include the HSS 708, the MME(s) 714, and the S-GW 712). A logical instantiation of a portion of the CN 706 may be referred to as a network sub-slice 704 (e.g., the network sub-slice 704 is shown to include the P-GW 716 and the PCRF 710).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 8:
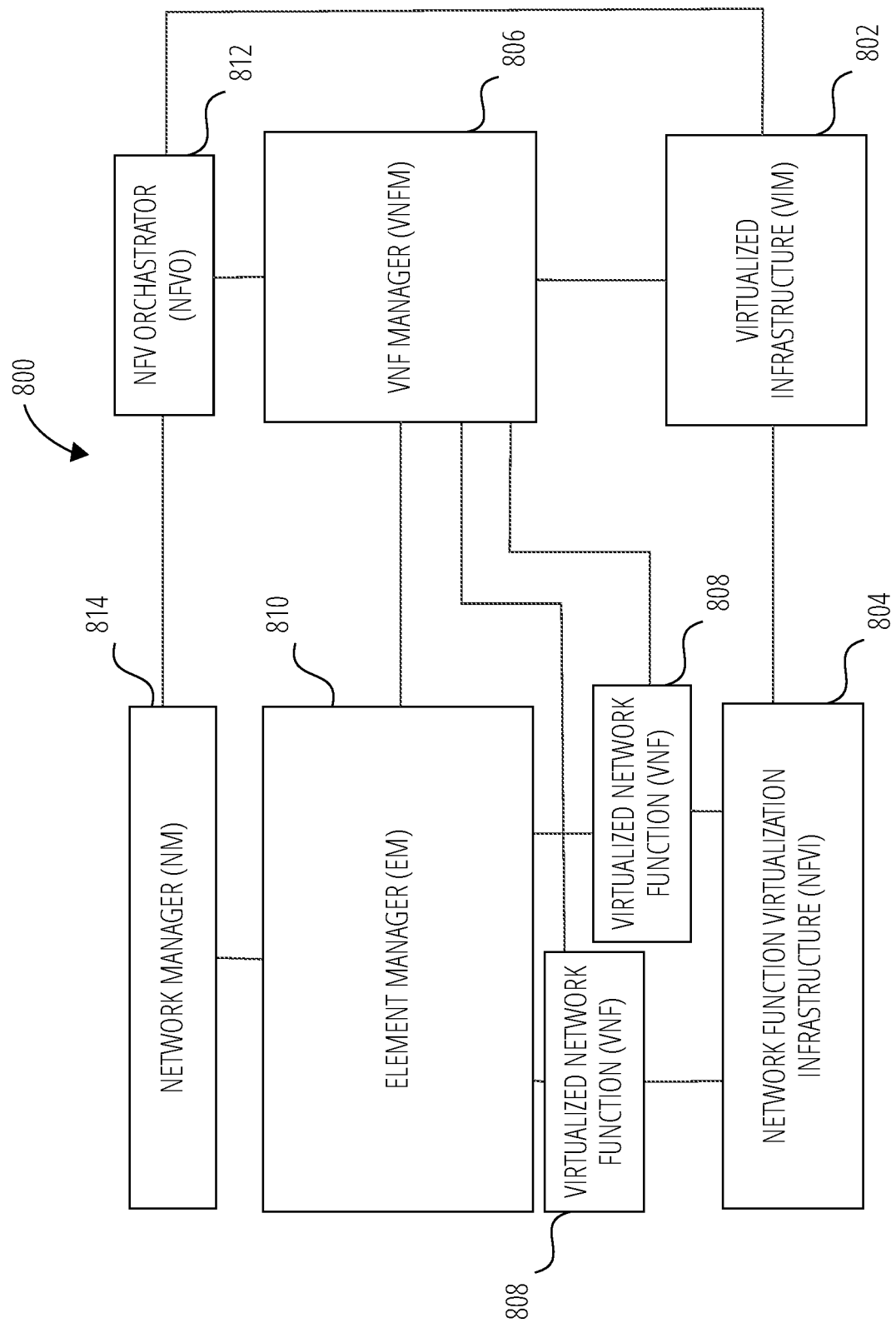
FIG. 8 illustrates a system in accordance with one embodiment.

FIG. 8 is a block diagram illustrating components, according to some example embodiments, of a system 800 to support NFV. The system 800 is illustrated as including a virtualized infrastructure manager (shown as VIM 802), a network function virtualization infrastructure (shown as NFVI 804), a VNF manager (shown as VNFM 806), virtualized network functions (shown as VNF 808), an element manager (shown as EM 810), an NFV Orchestrator (shown as NFVO 812), and a network manager (shown as NM 814).

The VIM 802 manages the resources of the NFVI 804. The NFVI 804 can include physical or virtual resources and applications (including hypervisors) used to execute the system 800. The VIM 802 may manage the life cycle of virtual resources with the NFVI 804 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM 806 may manage the VNF 808. The VNF 808 may be used to execute EPC components/functions. The VNFM 806 may manage the life cycle of the VNF 808 and track performance, fault and security of the virtual aspects of VNF 808. The EM 810 may track the performance, fault and security of the functional aspects of VNF 808. The tracking data from the VNFM 806 and the EM 810 may comprise, for example, performance measurement (PM) data used by the VIM 802 or the NFVI 804. Both the VNFM 806 and the EM 810 can scale up/down the quantity of VNFs of the system 800.

The NFVO 812 may coordinate, authorize, release and engage resources of the NFVI 804 in order to provide the requested service (e.g., to execute an EPC function, component, or slice). The NM 814 may provide a package of end-user functions with the responsibility for the management of a network, which may include network elements with VNFs, non-virtualized network functions, or both (management of the VNFs may occur via the EM 810).

Figure 9:
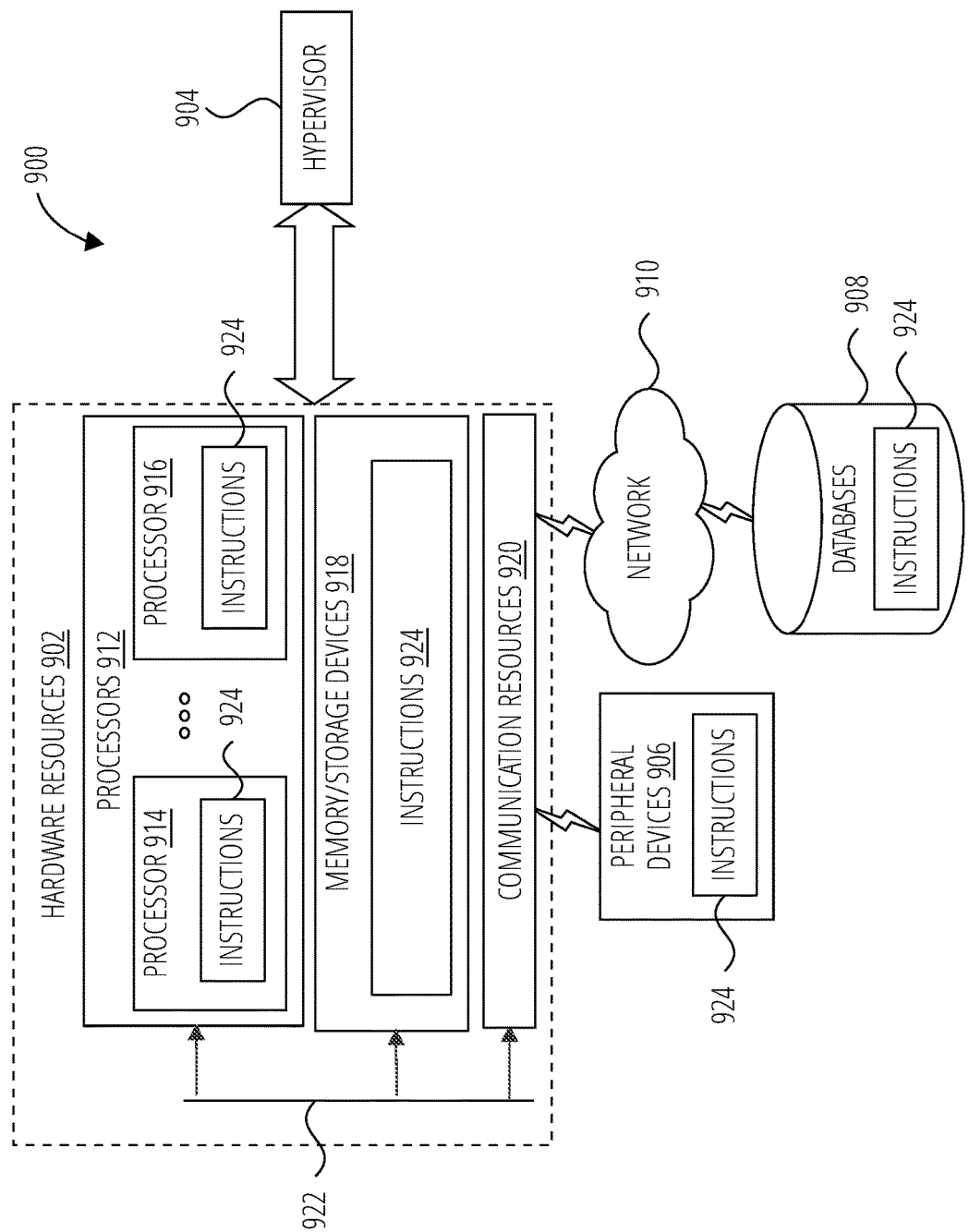
FIG. 9 illustrates components in accordance with one embodiment.

FIG. 9 is a block diagram illustrating components 900, according to some example embodiments, able to read instructions from a machine-readable or computer-readable medium (e.g., a non-transitory machine-readable storage medium) and perform any one or more of the methodologies discussed herein. Specifically, FIG. 9 shows a diagrammatic representation of hardware resources 902 including one or more processors 912 (or processor cores), one or more memory/storage devices 918, and one or more communication resources 920, each of which may be communicatively coupled via a bus 922. For embodiments where node virtualization (e.g., NFV) is utilized, a hypervisor 904 may be executed to provide an execution environment for one or more network slices/sub-slices to utilize the hardware resources 902.

The processors 912 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 914 and a processor 916.

The memory/storage devices 918 may include main memory, disk storage, or any suitable combination thereof. The memory/storage devices 918 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 920 may include interconnection or network interface components or other suitable devices to communicate with one or more peripheral devices 906 or one or more databases 908 via a network 910. For example, the communication resources 920 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 924 may comprise software, a program, an application, an applet, an app, or other executable code for causing at least any of the processors 912 to perform any one or more of the methodologies discussed herein. The instructions 924 may reside, completely or partially, within at least one of the processors 912 (e.g., within the processor's cache memory), the memory/storage devices 918, or any suitable combination thereof. Furthermore, any portion of the instructions 924 may be transferred to the hardware resources 902 from any combination of the peripheral devices 906 or the databases 908. Accordingly, the memory of the processors 912, the memory/storage devices 918, the peripheral devices 906, and the databases 908 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLE SECTION

The following examples pertain to further embodiments.

Example 1 is an apparatus for a user equipment (UE) in a wireless network. The apparatus includes a memory interface and a processor. The memory interface to send or receive, to or from a memory device, configuration data for a preconfigured uplink resource. The configuration data includes a radio network temporary identifier (RNTI) for idle mode communication. The processor to: in an idle mode, generate an uplink transmission using the preconfigured uplink resource; after the uplink transmission in idle mode using the preconfigured uplink resource, start a retransmission timer; and monitor a physical downlink control channel (PDCCH) with the RNTI provided in the configuration data for a hybrid automatic repeat request (HARQ) acknowledgment (ACK) or negative acknowledgment (NACK).

Example 2 is the apparatus of Example 1, wherein the processor is further configured to, in response to the retransmission timer expiring before receiving the ACK or the NACK, determine that the uplink transmission failed and generating a retransmission in another preconfigured uplink resource.

Example 3 is the apparatus of Example 2, wherein the processor is further configured to, after the retransmission, restart the retransmission timer.

Example 4 is the apparatus of Example 1, wherein the processor is further configured to, in response to the retransmission timer expiring before receiving the ACK or the NACK, initiate a fallback to early data transmission (EDT) or a random access procedure.

Example 5 is the apparatus of Example 1, wherein the processor is further configured to: while the retransmission timer is running, process a retransmission grant of an uplink resource; and generate a retransmission using the uplink resource of the retransmission grant.

Example 6 is the apparatus of Example 1, wherein the processor is further configured to: while the retransmission timer is running, receive the NACK, the NACK indicating to fallback to initiate early data transmission (EDT) or a random access procedure; and in response to the NACK, initiate the fallback to the EDT or the random access procedure.

Example 7 is the apparatus of Example 1, wherein the processor is further configured to: while the retransmission timer is running, receive at least one of a successful identifier (ID) and an indication that a contention resolution procedure is complete; and in response to the successful ID or the indication that the contention resolution procedure is complete, enter a sleep mode.

Example 8 is the apparatus of Example 1, wherein the processor is further configured to, while the retransmission timer is running, process a radio resource configuration (RRC) message comprising instructions to remain in the idle mode.

Example 9 is the apparatus of Example 1, wherein the processor is further configured to, while the retransmission timer is running, process a radio resource configuration (RRC) message comprising instructions to move from the idle mode to a connected mode.

Example 10 is the apparatus of Example 1, wherein multiple HARQ processes are supported in the idle mode, and wherein the processor is further configured to initiation a different random access procedure for each of the multiple HARQ processes.

Example 11 is the apparatus of Example 10, wherein at least one of a HARQ feedback message, a first grant of first uplink resources for a new transmission, and a second grant of second uplink resources for a retransmission in response to the uplink transmission using the preconfigured uplink resource comprises a HARQ process identifier (ID).

Example 12 is the apparatus of Example 1, wherein the processor is further configured to, while a timing advance (TA) validity timer is running, generate a message in the preconfigured uplink resource to a base station to release the preconfigured uplink resource.

Example 13 is the apparatus of Example 12, wherein to generate the message comprises to generate at least one of a radio resource control (RRC) message, a media access control (MAC) control element (CE), and layer 1 (L1) signaling in the preconfigured uplink resource.

Example 14 is a non-transitory computer-readable storage medium. The computer-readable storage medium including instructions that when executed by a processor of a user equipment (UE) in a wireless network, cause the processor to: store configuration data for a preconfigured uplink resource, the configuration data including a radio network temporary identifier (RNTI) for idle mode communication; in an idle mode, generate an uplink transmission using the preconfigured uplink resource; after the uplink transmission in idle mode using the preconfigured uplink resource, start a retransmission timer; and monitor a physical downlink control channel (PDCCH) in a common search space (CSS) with the RNTI provided in the configuration data for a hybrid automatic repeat request (HARQ) acknowledgment (ACK) or negative acknowledgment (NACK).

Example 15 is the computer-readable storage medium of Example 14, wherein the instructions further configure the processor to, in response to the retransmission timer expiring before receiving the ACK or the NACK, determining that the uplink transmission failed and generating a retransmission in another preconfigured uplink resource.

Example 16 is the computer-readable storage medium of Example 15, wherein the instructions further configure the processor to, after generating the retransmission, restart the retransmission timer.

Example 17 is the computer-readable storage medium of Example 14, wherein the instructions further configure the processor to, in response to the retransmission timer expiring before receiving the ACK or the NACK, initiating a fallback to early data transmission (EDT) or a random access procedure.

Example 18 is a method for a base station in a wireless network. The method includes: configuring a user equipment (UE) with a preconfigured uplink resource and a radio network temporary identifier (RNTI) for idle mode communication; processing an uplink transmission from the UE in the preconfigured uplink resource for idle mode communication; and in response to the uplink transmission, generating a message for the UE using the RNTI.

Example 19 is the method of Example 18, wherein configuring the UE with the preconfigured uplink resource comprises generating a radio resource control (RRC) message comprising configuration data for the preconfigured uplink resource, the configuration data including the RNTI.

Example 20 is the method of Example 18, wherein configuring the UE with the preconfigured uplink resource comprises generating a broadcast message comprising configuration data for the preconfigured uplink resource, the configuration data including the RNTI.

Example 21 is the method of Example 18, wherein generating the message for the UE using the RNTI comprises generating a retransmission grant of an uplink resource.

Example 22 is the method of Example 18, wherein generating the message for the UE using the RNTI comprises generating a negative acknowledgment (NACK) comprising an indication for the UE to fallback to early data transmission (EDT) or a random access procedure.

Example 23 is the method of Example 18, wherein generating the message for the UE using the RNTI comprises generating at least one of a successful identifier (ID) and an indication that a contention resolution procedure is complete to indicate to the UE to enter a sleep mode.

Example 24 is the method of Example 18, wherein generating the message for the UE using the RNTI comprises generating a radio resource configuration (RRC) message comprising instructions for the UE to remain in the idle mode.

Example 25 is the method of Example 18, wherein generating the message for the UE using the RNTI comprises generating a radio resource configuration (RRC) message comprising instructions for the UE to move from the idle mode to a connected mode.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed.

Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. An apparatus for a user equipment (UE) in a wireless network, the apparatus comprising:
a memory interface to send or receive, to or from a memory device, configuration data for a first preconfigured uplink resource, the configuration data for the first preconfigured uplink resource including a radio network temporary identifier (RNTI) for idle mode communication; and
a processor to:
in an idle mode, generate an uplink transmission comprising uplink data using the first preconfigured uplink resource;
after the uplink transmission in the idle mode using the first preconfigured uplink resource, start a retransmission timer;
while the retransmission timer is running, receive at least one of a successful identifier (ID) and an indication that a contention resolution procedure is complete;
in response to the successful ID or the indication that the contention resolution procedure is complete, enter a sleep mode;
monitor a physical downlink control channel (PDCCH) with the RNTI for the idle mode communication provided in the configuration data for a hybrid automatic repeat request (HARQ) acknowledgment (ACK) or negative acknowledgment (NACK); and
in response to the retransmission timer expiring before receiving the ACK or the NACK, determine that the uplink transmission failed and generating a retransmission comprising the uplink data in a second preconfigured uplink resource.

2. The apparatus of claim 1, wherein the processor is further configured to, after the retransmission, restart the retransmission timer.

3. The apparatus of claim 1, wherein the processor is further configured to, in response to the retransmission timer expiring before receiving the ACK or the NACK, initiate a fallback to early data transmission (EDT) or a random access procedure.

4. The apparatus of claim 1, wherein the processor is further configured to:
while the retransmission timer is running, process a retransmission grant of an uplink resource; and
generate the retransmission using the uplink resource of the retransmission grant.

5. The apparatus of claim 1, wherein the processor is further configured to, while the retransmission timer is running, process a radio resource configuration (RRC) message comprising instructions to remain in the idle mode.

6. The apparatus of claim 1, wherein the processor is further configured to, while the retransmission timer is running, process a radio resource configuration (RRC) message comprising instructions to move from the idle mode to a connected mode.

7. The apparatus of claim 1, wherein multiple HARQ processes are supported in the idle mode, and wherein the processor is further configured to initiate a different random access procedure for each of the multiple HARQ processes.

8. The apparatus of claim 7, wherein at least one of a HARQ feedback message, a first grant of first uplink resources for a new transmission, and a second grant of second uplink resources for a retransmission in response to the uplink transmission using the first preconfigured uplink resource comprises a HARQ process identifier (ID).

9. The apparatus of claim 1, wherein the processor is further configured to, while a timing advance (TA) validity timer is running, generate a message in the first preconfigured uplink resource to a base station to release the first preconfigured uplink resource.

10. The apparatus of claim 9, wherein to generate the message comprises to generate at least one of a radio resource control (RRC) message, a media access control (MAC) control element (CE), and layer 1 (L1) signaling in the first preconfigured uplink resource.

11. A non-transitory computer-readable storage medium, the computer-readable storage medium including instructions that when executed by a processor of a user equipment (UE) in a wireless network, cause the processor to:
store configuration data for a first preconfigured uplink resource, the configuration data including a radio network temporary identifier (RNTI) for idle mode communication;
in an idle mode, generate an uplink transmission comprising uplink data using the first preconfigured uplink resource;
after the uplink transmission in the idle mode using the first preconfigured uplink resource, start a retransmission timer;
while the retransmission timer is running, receive at least one of a successful identifier (ID) and an indication that a contention resolution procedure is complete;
in response to the successful ID or the indication that the contention resolution procedure is complete, enter a sleep mode;
monitor a physical downlink control channel (PDCCH) in a common search space (CSS) with the RNTI for the idle mode communication provided in the configuration data for a hybrid automatic repeat request (HARQ) acknowledgment (ACK) or negative acknowledgment (NACK); and in response to the retransmission timer expiring before receiving the ACK or the NACK, determine that the uplink transmission failed and generating a retransmission comprising the uplink data in a second preconfigured uplink resource.

12. The non-transitory computer-readable storage medium of claim 11, wherein the instructions further configure the processor to, after generating the retransmission, restart the retransmission timer.

13. The non-transitory computer-readable storage medium of claim 11, wherein the instructions further configure the processor to, in response to the retransmission timer expiring before receiving the ACK or the NACK, initiating a fallback to early data transmission (EDT) or a random access procedure.

* * * * *